US008151569B2

(12) United States Patent
Stallings (10) Patent No.: US 8,151,569 B2
(45) Date of Patent: Apr. 10, 2012

(54) SYSTEM AND METHOD FOR TRANSMITTING THERMAL ENERGY

(76) Inventor: James R. Stallings, Louisa, VA (US)

( * ) Notice: Subject to any disclaimer, the term of this patent is extended or adjusted under 35 U.S.C. 154(b) by 0 days.

(21) Appl. No.: 12/946,036

(22) Filed: Nov. 15, 2010

(65) Prior Publication Data

US 2011/0100012 A1   May 5, 2011

Related U.S. Application Data

(60) Provisional application No. 61/322,428, filed on Apr. 9, 2010, provisional application No. 61/261,836, filed on Nov. 17, 2009.

(51) Int. Cl.
| F03G 7/04 | (2006.01) |
| F03G 7/06 | (2006.01) |
| F03G 7/00 | (2006.01) |
| F03G 6/00 | (2006.01) |
| F01K 27/00 | (2006.01) |
| F03D 9/00 | (2006.01) |

(52) U.S. Cl. .................. 60/641.6; 60/641.1; 60/641.12; 290/55

(58) Field of Classification Search ................. 60/641.1, 60/641.6, 641.12; 290/43, 44, 54, 55
See application file for complete search history.

(56) References Cited

U.S. PATENT DOCUMENTS

| 27,853 A | 4/1860 | Woodward | |
| 3,436,908 A * | 4/1969 | Van Delic | 126/634 |
| 3,875,926 A | 4/1975 | Frank | |
| 3,936,652 A * | 2/1976 | Levine | 290/2 |
| 3,977,196 A | 8/1976 | Sedille | |
| 4,015,584 A | 4/1977 | Haberman | |
| 4,016,725 A * | 4/1977 | Fiss | 60/690 |
| 4,080,186 A | 3/1978 | Ockert | |
| 4,096,698 A * | 6/1978 | Martin | 60/641.12 |
| 4,106,295 A * | 8/1978 | Wood | 60/649 |
| 4,117,683 A | 10/1978 | Rasmussen | |
| 4,148,617 A | 4/1979 | Clark | |
| 4,197,713 A | 4/1980 | Bulang | |
| 4,275,309 A | 6/1981 | Lucier | |
| 4,282,070 A | 8/1981 | Egosi | |

(Continued)

OTHER PUBLICATIONS http://en.wikipedia.org/wiki/Solar_updraft_tower; printed Oct. 25, 2010.

*Primary Examiner* — Thomas Denion
*Assistant Examiner* — Christopher Jetton
(74) *Attorney, Agent, or Firm* — Sughrue Mion, PLLC (57) ABSTRACT

A system and method for transmitting thermal energy. The system includes an intake for introducing air at a first temperature; an exhaust for exhausting the air, the exhaust being provided at a higher vertical elevation than intake; and a thermal energy source provided at second temperature higher than the first temperature, the waste thermal energy source being provided between the intake and the exhaust. The air introduced via the intake, passes the thermal energy source, and is exhausted via the exhaust due to a difference in elevation between the intake and the exhaust. The thermal energy source can be a waste thermal industrial energy source. The system can include a first ambient energy chamber configured to pass the air through the thermal energy source and an insulated, and a second ambient energy chamber provided between the ambient energy chamber and the exhaust, wherein the second ambient energy chamber is a made of a slow-loading thermal material.

20 Claims, 8 Drawing Sheets

U.S. PATENT DOCUMENTS

| | | | |
|---|---|---|---|
| 4,343,691 A | 8/1982 | Minkkinen | |
| 4,359,870 A * | 11/1982 | Holton, Sr. | 60/641.12 |
| 4,391,099 A * | 7/1983 | Sorensen | 60/641.6 |
| 4,453,383 A * | 6/1984 | Collins | 60/641.12 |
| 4,494,009 A * | 1/1985 | Yukl | 290/55 |
| 4,507,916 A * | 4/1985 | Anderson | 60/641.1 |
| 4,537,248 A | 8/1985 | Minami | |
| 4,779,006 A * | 10/1988 | Wortham | 290/55 |
| 4,878,349 A * | 11/1989 | Czaja | 60/674 |
| 4,957,624 A | 9/1990 | Peranio | |
| 5,395,598 A * | 3/1995 | Prueitt | 422/168 |
| 5,461,876 A | 10/1995 | Dressler | |
| 6,216,463 B1 | 4/2001 | Stewart | |
| 6,250,097 B1 | 6/2001 | Lui et al. | |
| 6,684,648 B2 | 2/2004 | Faqih | |
| 6,767,471 B2 | 7/2004 | Max | |
| 7,757,490 B2 * | 7/2010 | Kenessey | 60/641.12 |
| 2005/0154724 A1 | 7/2005 | Lipe et al. | |
| 2005/0275225 A1 | 12/2005 | Bertolotti | |

* cited by examiner

SYSTEM AND METHOD FOR TRANSMITTING THERMAL ENERGY

CROSS-REFERENCE TO RELATED APPLICATIONS

This application claims priority from U.S. provisional application No. 61/261,836, filed Nov. 17, 2009, and U.S. provisional application No. 61/322,428, filed Apr. 9, 2010. The entire contents of these applications are incorporated herein by reference.

FIELD OF THE INVENTION

The present invention relates to a system and method for transmitting ambient thermal energy via air from a first location to a second location where the thermal energy can be used.

BACKGROUND OF THE INVENTION

When one looks upon the wasted ambient thermal energy of an industrial warm water lake, one wonders if that heat energy could be captured and funneled into productive use, without the use of artificial power or without mechanical means. Likewise, other waste thermal energy sources, such as parking lots or roads, hold such a large amount of heat energy that they change the environmental conditions of cities. In fact, cities can be considered as "urban heat islands" due to the amount of stored energy compared to surrounding areas.

A renewable energy system that can move thermal energy from these waste heat sources and use the energy productively would both provide a source of energy where it is needed and also provide a re-greening of the waste heat source by reducing its temperature to one that is more suitable for its natural environment.

SUMMARY OF THE INVENTION

Aspects of the invention are directed to systems and methods for transmitting thermal energy.

According to one aspect of the invention, the system includes an intake for introducing air at a first temperature; an exhaust for exhausting the air, the exhaust being provided at a higher vertical elevation than intake; and a thermal energy source provided at second temperature higher than the first temperature, the waste thermal energy source being provided between the intake and the exhaust. The air introduced via the intake, passes the thermal energy source, and is exhausted via the exhaust due to a difference in elevation between the intake and the exhaust. The thermal energy source can be a waste thermal energy source.

According to another aspect of the invention, the thermal energy source can be a waste thermal energy source. The exemplary embodiment can include a first ambient energy chamber configured to pass the air through the thermal energy source and an insulated, and a second ambient energy chamber provided between the ambient energy chamber and the exhaust, wherein the second ambient energy chamber is a made of a slow-loading thermal material.

BRIEF DESCRIPTION OF THE DRAWINGS

The above and other aspects of the present invention will become more apparent from the following description of exemplary embodiments, taken in conjunction with the accompanying drawings of which.

DETAILED DESCRIPTION OF THE EXEMPLARY EMBODIMENTS

The matters defined in the description are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The exemplary embodiments use the principles of conduction, convection, and condensation, to transfer thermal energy from matter and transport that heat away from a thermal energy source, while producing an artificial wind within the system that can be used to product power or transfer the thermal energy. The exemplary embodiments are even more environmentally friendly than current environmentally friendly systems, such as wind turbines, in that the systems are able to transfer energy without moving parts and provide a regeneration or "re-greening" of the thermal energy source, if it is a waste energy source.

The system works most effectively when it is utilized in such a manner to reverse the environmental effects of thermal pollution, such as the impact a warm water lake has on the immediate environment around a power or industrial plant. For example, aquatic life within an industrial warm water lake is adversely affected by high water temperatures. Moreover, by conducting and moving the thermal energy away from the warm water, the efficiency of an industrial plant increases because the temperature of the water used to cool the plant is reduced and can more effectively cool the plant.

Figure 1:
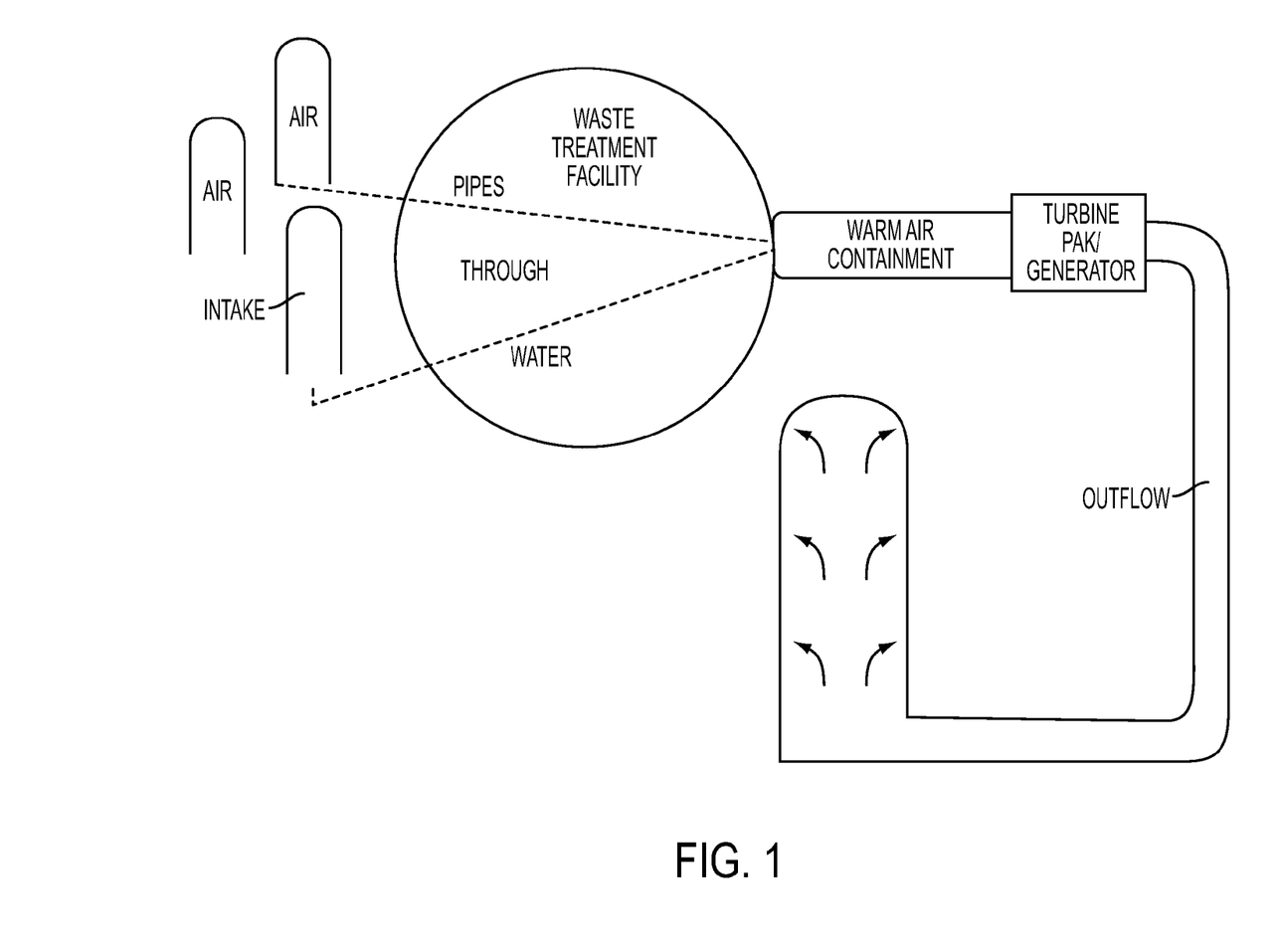
FIG. 1 is a conceptual view of a first exemplary embodiment of the invention.

FIG. 1 is a conceptual view of a first exemplary embodiment of the invention. In this embodiment, low temperature air is sucked from an intake, passes through pipes within a waste thermal energy source, for example an industrial warm water lake, and is exhausted via an exhaust tower due to a difference in elevation between the intake and the exhaust tower.

As the air passes through the lake water, the air's temperature increases while the lake's temperature decreases, provide a "re-greening" of the industrial warm water lake toward its natural temperature. Moreover, in this exemplary embodiment, in addition to the "re-greening" of the waste thermal energy source, the air passes through a turbine that generates electricity. That is, as the temperature of the air increases, the flow of the air toward the exhaust tower also increases as the hot air rises faster. This creates a low pressure point where the air was heated, and therefore an artificial wind within the system that can be productively used, as discussed in detail below.

The systems can provide a method of industrial water cooling, which extracts thermal energy (heat) and cools the industrial hot water continuously without mechanical means. The systems provide industrial cooling with no evaporative cooling, as with conventional cooling towers, or spray water in the air cooling ponds. Thus, the systems are suitable to cool industrial hot water after, for example, an accident has crippled the normal powered cooling systems at a nuclear power plant. In an emergency shutdown incident where the lake temperature has increased due to response, the system can be used to safeguard the industrial plant and the surrounding resident population. As long as the conditions of elevation and thermal dynamics exist, even if there is a very low temperature difference, the system will function and do so without removing water from the industrial lake or further depleting water from the watershed. The addition a system consistent with the exemplary embodiments to a nuclear station is passive, i.e., no power required, emergency safety system that will function and cool water when all other systems fail. It is a fail-safe that can be added to nuclear plant operation safety systems, already in place in place, and will increase the operating efficiency of the plant by reducing the cooling water temperature and making additional electrical power. But because it is in place when all remote transmission power to the industrial plant, and generators or fuel for those generators expire, and the system will function and provide cooling until the plant's water temperatures reaches air intake levels, far lower than those required to safeguard aquatic life and cool water after an incident or terrorist attack on such a facility.

To summarize, the exemplary embodiment includes an intake for introducing air at a first temperature; an exhaust for exhausting the air, the exhaust being provided at a higher vertical elevation than intake; and a thermal energy source provided at second temperature higher than the first temperature, the waste thermal energy source being provided between the intake and the exhaust. The air introduced via the intake, passes the thermal energy source, and is exhausted via the exhaust due to a difference in elevation between the intake and the exhaust. The thermal energy source can be a waste thermal energy source. The exemplary embodiment can include a first ambient energy chamber configured to pass the air through the thermal energy source and an insulated, second ambient energy chamber provided between the ambient energy chamber and the exhaust, wherein the second ambient energy chamber is a made of a slow-loading thermal material.

In this exemplary embodiment, the first ambient energy chamber is fabricated from thermally conductive material, such as metals like copper, aluminum or steel, configured to pass through the thermal energy source and is coupled to the source as the first ambient energy chamber exits the thermal energy source to another or series of second transmission ambient energy chambers fabricated from slow-loading thermally conductive materials like stone, concrete or ceramic. The configuration and shape of the transmission portion of the second ambient energy chambers can be identical to the thermal energy absorbing portion of the first ambient energy chambers. The differentiations in the absorbing and the transmission portions of the chambers is their material make up and the function of each portion of the system.

Each ambient energy chamber initially absorbs and thermally conducts ambient energy into and within the ambient energy chamber immersed in the thermal wasted energy source. By the process of convection, the heated air moves through the system to the next ambient energy chamber, which is designed for transmission and thermal absorption and thermal loading. The second ambient energy chamber (e.g., made of rock or concrete) is insulated in its exterior to isolate the thermal signature from the ground or the air that the system is installed within, and the second ambient energy chamber is constructed toward its delivery destination.

The slow-loading ambient energy chamber acts like a straw that is drawing in thermal energy and wicking it away like a rope absorbs water from a bucket. Similar to a rope in a bucket of water, in which it is the initial loading of the fibers with liquid that facilitates the capillary action that will then facilitate the movement of water without mechanical means out of the bucket and onto the floor, the slow-loading ambient energy chamber thermally couples thermal energy from the first ambient energy chamber (e.g., metal) immersed within the thermal waste energy source to the second slow-loading ambient energy chambers (e.g., concrete and stone) that initially absorb some portion of the thermal energy recovered as it loads the system thermally (i.e., as water loads the rope with liquid). When the second ambient energy chambers reach their thermal operational range, the system of the exemplary embodiment reaches its operationally productive range.

Figure 2:
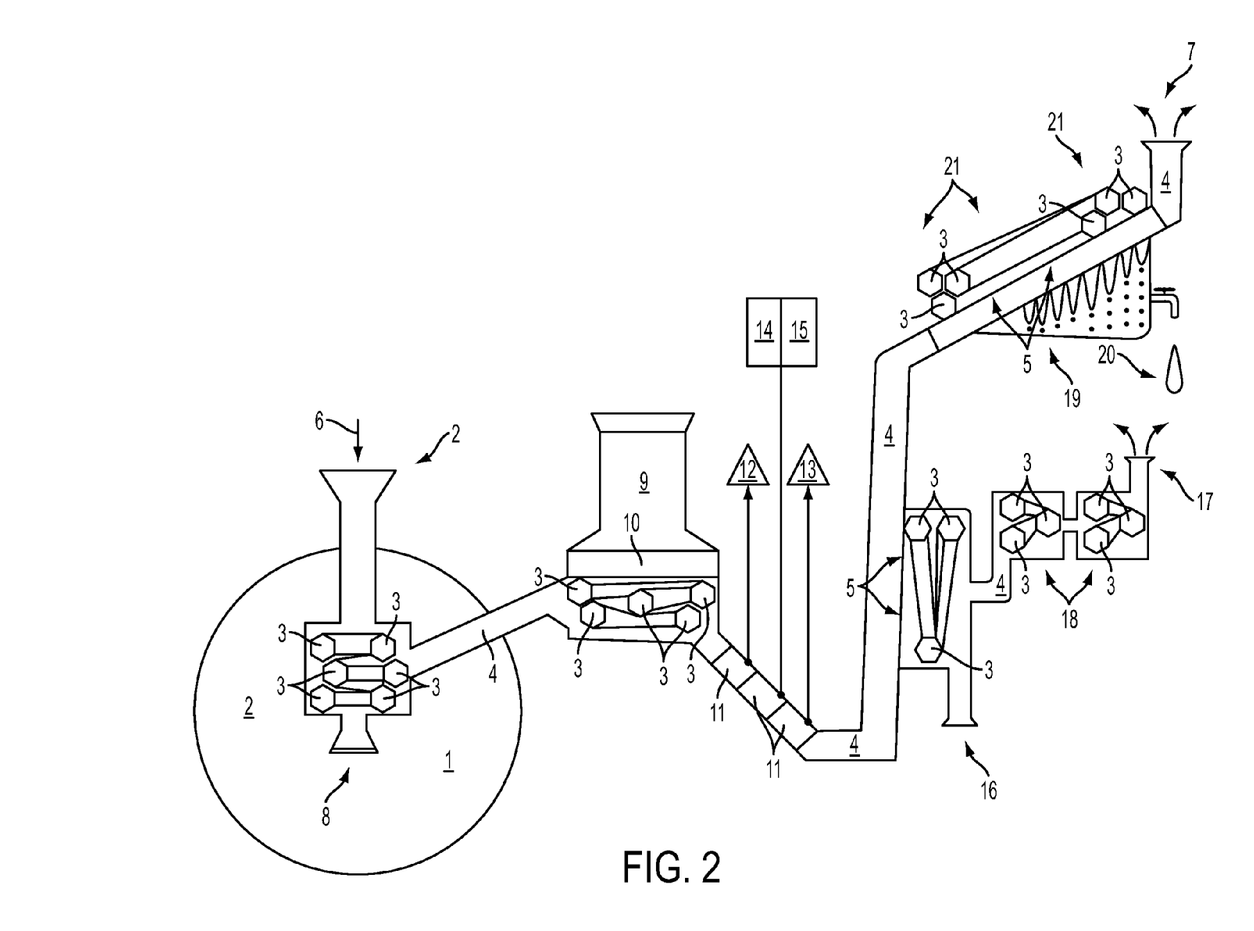
FIG. 2 is a more detailed conceptual view of the first exemplary embodiment.

FIG. 2 is a more detailed conceptual view of the first exemplary embodiment showing several systems that are consistent with the invention. Of course, as with the other exemplary embodiments, the invention is not limited to or by these systems.

In this embodiment, cooler air is introduced via the intake 6, which is provided over land. The air can be, for example, air within a wooded area or cave that has a lower temperature. The air will be sucked into the intake 6 due to the fact that the exhaust 7 is located at a higher elevation than the intake 6.

The air passes through a thermal energy source, such as warm water lake 1 (for example, 60-90° F.) via ambient energy chambers 3. The ambient energy chambers 3 will be discussed in detail below with respect to FIG. 4. When the air passes through the lake 1, the air's temperature is increased, creating the artificial wind discussed above.

Then, the air passes through piping 4 (i.e., example of second ambient energy chamber) to a cooling tower 9 of an industrial plant, such as a nuclear plant. The piping 4 provided after the air passes the thermal energy source (e.g., lake 1) is preferably made of a slow-loading thermal material (e.g., concrete, asphalt, or rock). As discussed in detail above, if the transmission piping 4 is made of a slow-loading thermal material, after an extended period of time, the temperature of the transmission piping 4 will reach substantially the same temperature as the ambient energy chamber. Thus, in addition to the heating within the ambient air chamber, the air will be further heated as it passes through the piping 4. Moreover, the system will continue to heat the air using the piping 4 even if the temperature of the thermal energy source is reduced.

Specifically, the air passes via ambient energy chambers 3 provided within the cooling water 10 of the tower 9. By passing through this water 10, the air's temperature is further increased.

The air can then pass through various systems for productively using the artificial wind, for example, AC, DC, oxygen or hydrogen generators 11. A hydrogen storage 12, oxygen storage 13, AC ports 14, and DC ports 15 are shown in FIG. 2.

Then, the air passes through additional insulated piping 4 to a mini-chamber system. That is, a portion 5 of the insulation is removed from the piping 4 and the heat is transferred to a mini-chamber. The mini-chamber includes a cool air intake 16 and an exhaust 17. The heated air from the piping 4 passes to ambient energy chambers 3 within the mini-chamber. This heat can then be used to provide heating to an external system via heating matter pads 18.

The air then passes through a system that provides purified water by condensation. That is, another portion 5 of the insulation is removed from the piping 4, and the heated air from the piping 4 passes to ambient energy chambers 3 buried within the ground 21 (e.g., at a temperature of 54° F.). The cooling of the heated air within the ambient energy chambers 3 by the ground 21 causes condensation. Purified water 20 can be collected from a condensation chamber 19. Finally, the air is exhausted via the exhaust 7.

Figure 3:
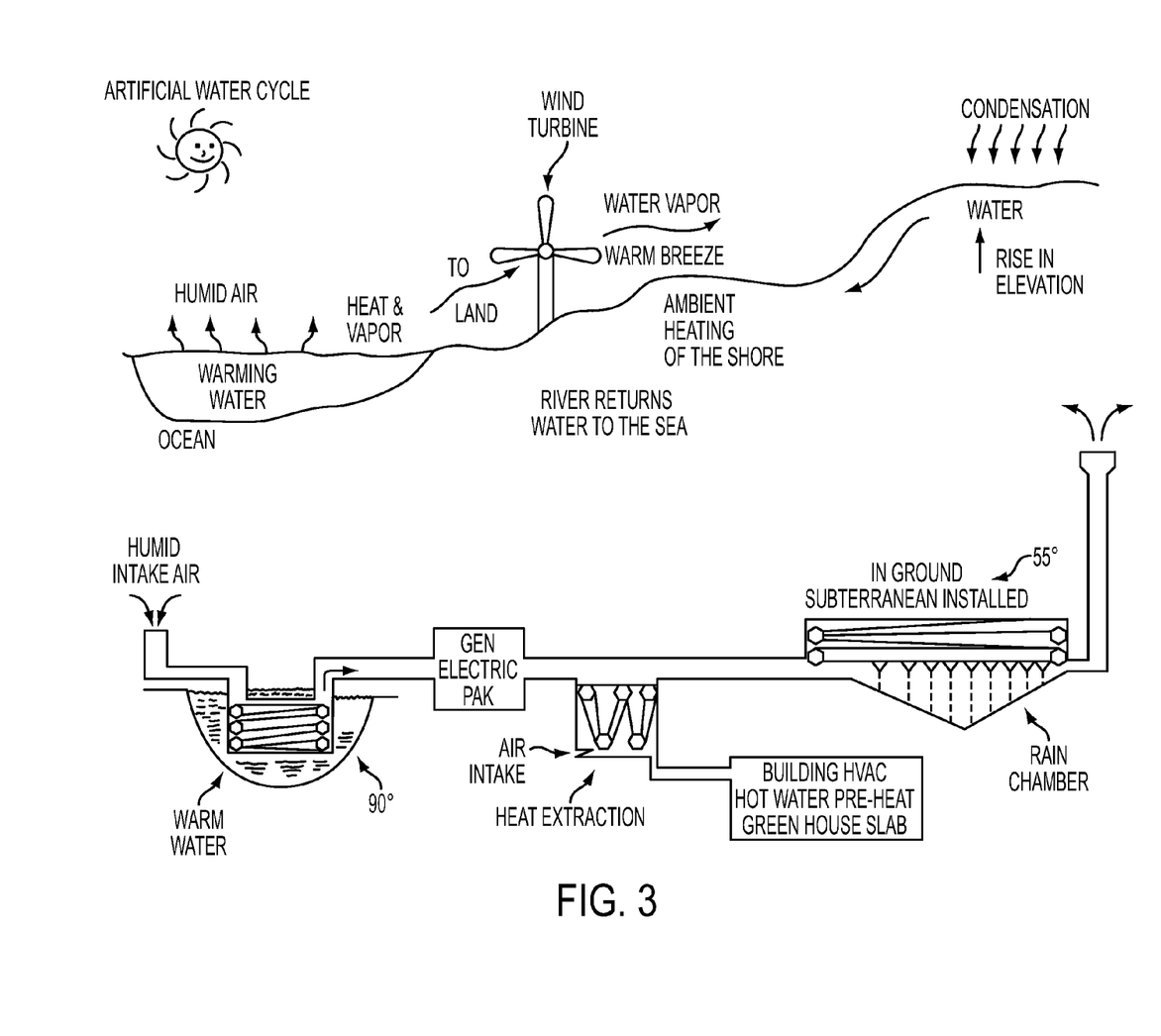
FIG. 3 shows a second exemplary embodiment that is analogous to a water cycle.

FIG. 3 shows a second exemplary embodiment of the invention in which the system is configured to recover heat and condensate water. That is, the system can be used to create an artificial and contained water cycle, doing everything that the earth's water cycle does. The system moves humid air to a higher elevation and produces wind, which can be used for green energy production. In this exemplary embodiment, water is condensed by an in-ground subterranean, and through the same containment returns the recovered water to the ambient thermal energy source, e.g., a warm water industrial lake. Moreover, in this exemplary embodiment, the heat is extracted and can be used, for example, in a building HVAC unit, a hot water pre-heat, or a green house slab.

Figure 4:
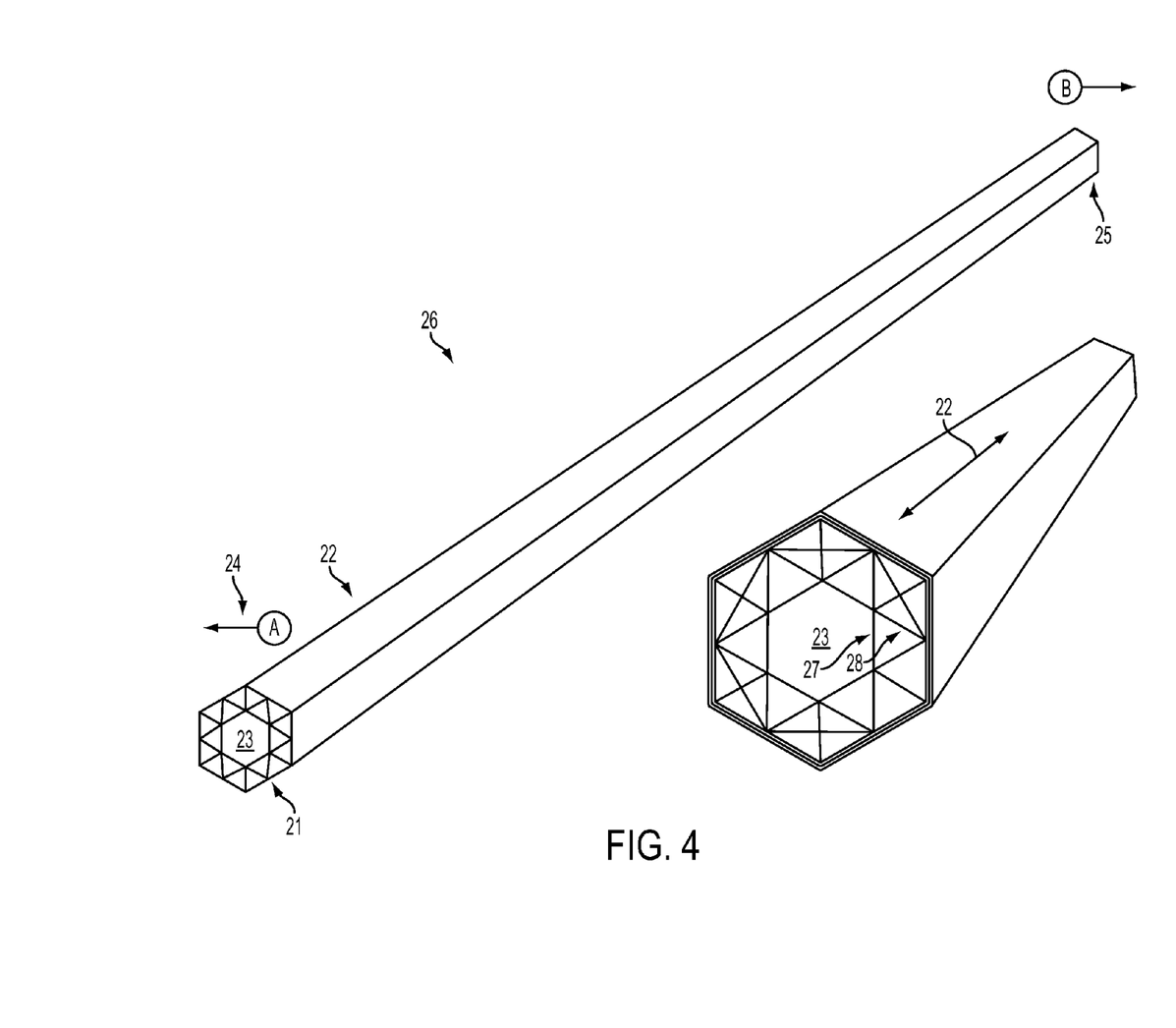
FIG. 4 shows an exemplary embodiment of an ambient energy chamber.

FIG. 4 shows an exemplary embodiment of an ambient energy chamber. In this exemplary embodiment, the ambient energy chamber includes an intake 21, an exhaust 25, a thermal conductive outer shell 22, and a thermally conductive interior air chamber 23. Thermally conductive walls 27 and fins 28 provide increased surface area to improve heat transfer between the ambient energy source 26 and the ambient energy chamber. Preferably, the elevation 4 of the exhaust 25 (i.e., B) is higher than that of the intake 21 (i.e., A), thus improving the airflow through the ambient energy chamber.

In this embodiment, the ambient energy chamber is constructed of thermally conductive materials (e.g., copper, aluminum, steel, etc.), and can be, for example, round, rectangular or hexadecimal shaped pipes or conduits, having internal wall structures shaped into heat sink or fin configurations 28.

The ambient energy chamber is preferably installed in a manner where the intake 21 is not far above, but not immersed in the water (or other matter). The ambient energy chamber conducts thermal energy from the water (or other matter) by the principle of conduction. The internal fins and heat sinks 28 transfer thermal energy by conduction to air entering the intake 21. The heated air within the ambient energy chamber exits the elevated exhaust 25 by means of an artificial wind created by the principle of convective air rise. The exiting air creates a low pressure zone that sucks additional air into the ambient energy chamber.

Figure 5:
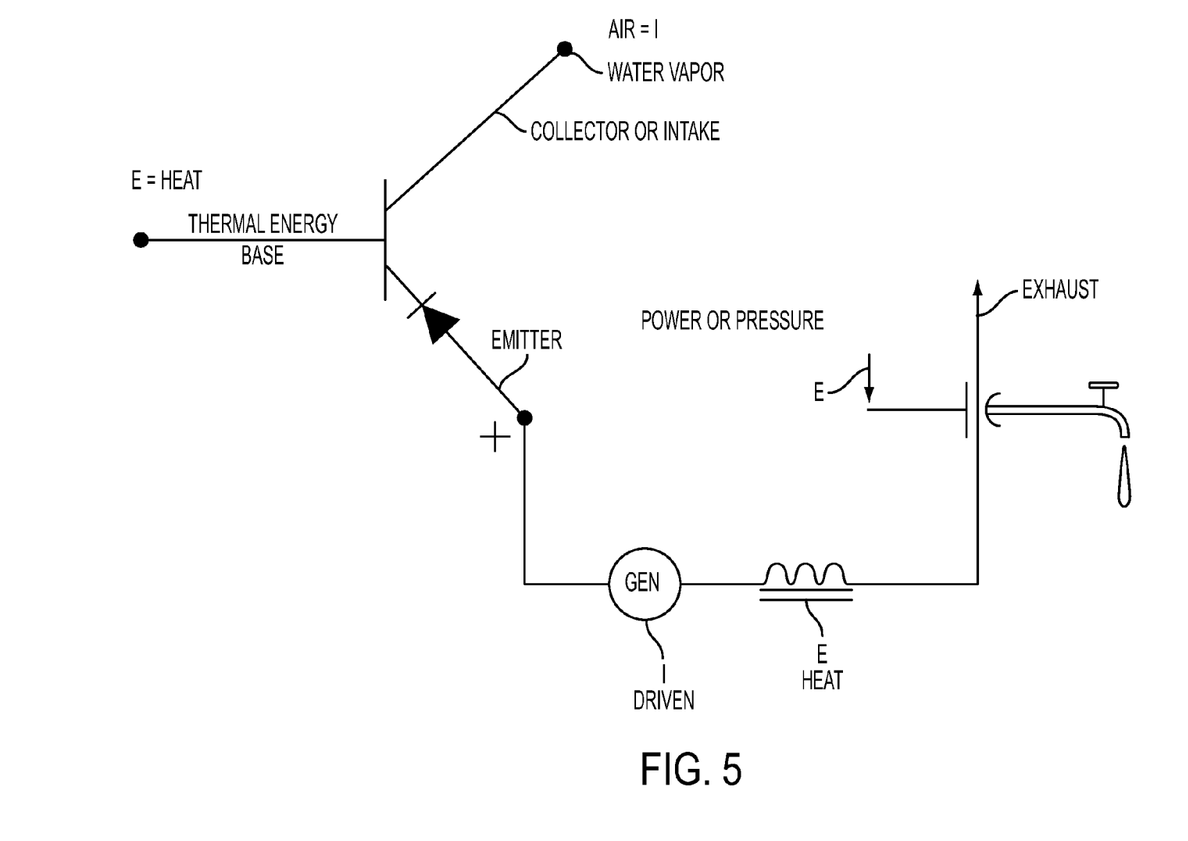
FIG. 5 shows how the exemplary embodiments are analogous to a transistor.

FIG. 5 shows how the exemplary embodiments are analogous to a transistor. The three basic components of the exemplary embodiments are the intake, the thermal energy source, and the exhaust. The basic components are analogous to the three basic components of a transistor—the collector, the base, and the emitter. In the exemplary embodiments, the movement of air from the intake to the exhaust is amplified passively, continuously, and without mechanical processes by the ambient thermal energy available from the thermal energy source through the thermal dynamic processes of conduction and convection. The process produces one of more of the following: heat, air flow, air pressure and/or water.

The collector (intake) is positioned lower in elevation than the emitter (exhaust). The thermal temperature of the matter at the thermal energy source is higher than the air temperature at the collector (intake). The greater the potential difference between the base temperature and the collector air temperature, the greater the thermal energy recovery and the greater the pressurized airflow energy.

Although there are existing renewable technologies that utilize the principles of warm air rising, the collection mechanisms in these systems are intrusive and large. In contrast, a system constructed according to the exemplary embodiments optimize thermal collection utilizing not just the principle of convection, but also the principles of containment, conduction and convective air movement and can accomplish extraction of thermally ambient energy stored in all types of matter. The system is positioned through the material to which it is designed to recover ambient thermal energy, while other existing technologies require the thermally resonant materials to be within the containment system or underneath the renewable technology device. Because of this difference, the exemplary embodiments can extract thermal energy from all types of matter, including matter in the form of gas or thermal energy delivered by solar radiation. The thermal energy and air are moved passively, continuously and efficiently without mechanical means.

Unlike existing renewable technologies, a system consistent with the exemplary embodiments is a two way device. The system can both absorb thermal energy and deliver thermal energy. The system can be made from a vast array of conductive materials. Depending on the topography of the environment or area to which the system is installed or constructed, the system can function while remaining completely obscured from view. Because there are no moving parts, the system requires no mechanical maintenance. As long as the system is structurally sound, it will perform its functions indefinitely.

The thermal dynamic range of the exemplary embodiments extends throughout the temperature spectrum. This can be analogized to the radio frequency (RF) spectrum in which antenna is configured to transmit and/or receive electrical energy within a frequency range. Likewise, the exemplary embodiments work and produce artificial wind as long as there is (1) a thermal difference between the ambient energy source and the intake and (2) the exhaust is higher in elevation than the intake.

Figure 6:
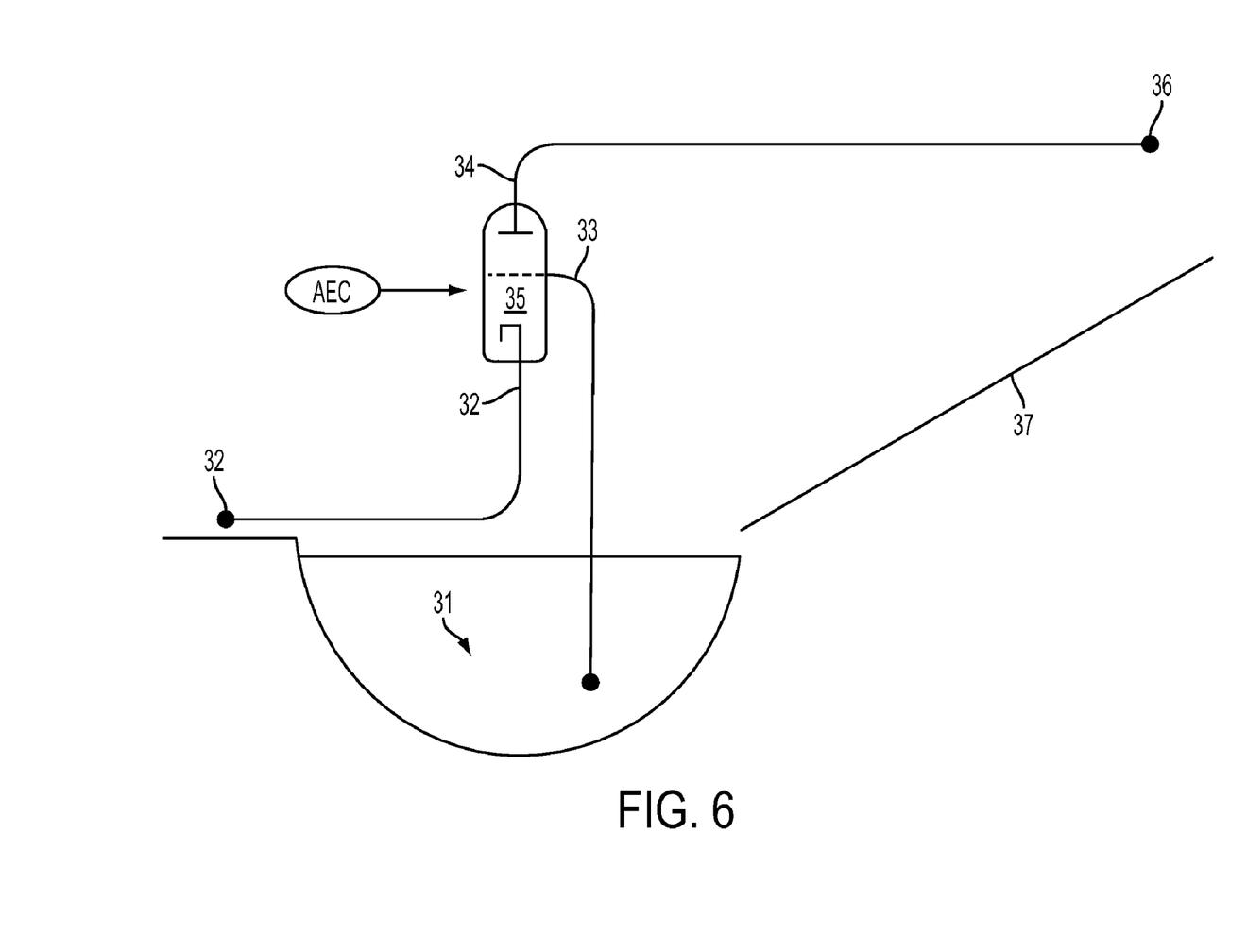
FIG. 6 shows how the exemplary embodiments are analogous to a tube amplifier, the precursor to a transistor.

FIG. 6 shows how the exemplary embodiments are analogous to a tube amplifier, the precursor to a transistor. That is, the system has two distinct points of differing potential. Instead of the voltage differentials of a tube amplifier, the difference in potential in the exemplary embodiments is a rise in elevation 37 between the intake 32 and the exhaust 36. The higher the elevation difference, the more artificial wind can be created due to the rising of air toward the exhaust 36.

The ambient energy source 31 applies thermal energy at location 33 to increase the heat of internal heat sinks 35 of an ambient energy chamber. Because the air intake 32 is provided at a cooler temperature than the ambient energy source 31, the air temperature at the exhaust 34 of the ambient energy chamber is increased, and an artificial wind is increased as the air exits the higher elevation exhaust 36. When the ambient energy chamber of the exemplary embodiments is immersed in warm matter (e.g., liquid or solid) thermal energy is transferred from outside the device, and warms the internal air, which is stimulated and rises by convection to the elevated exhaust portion.

Figure 7:
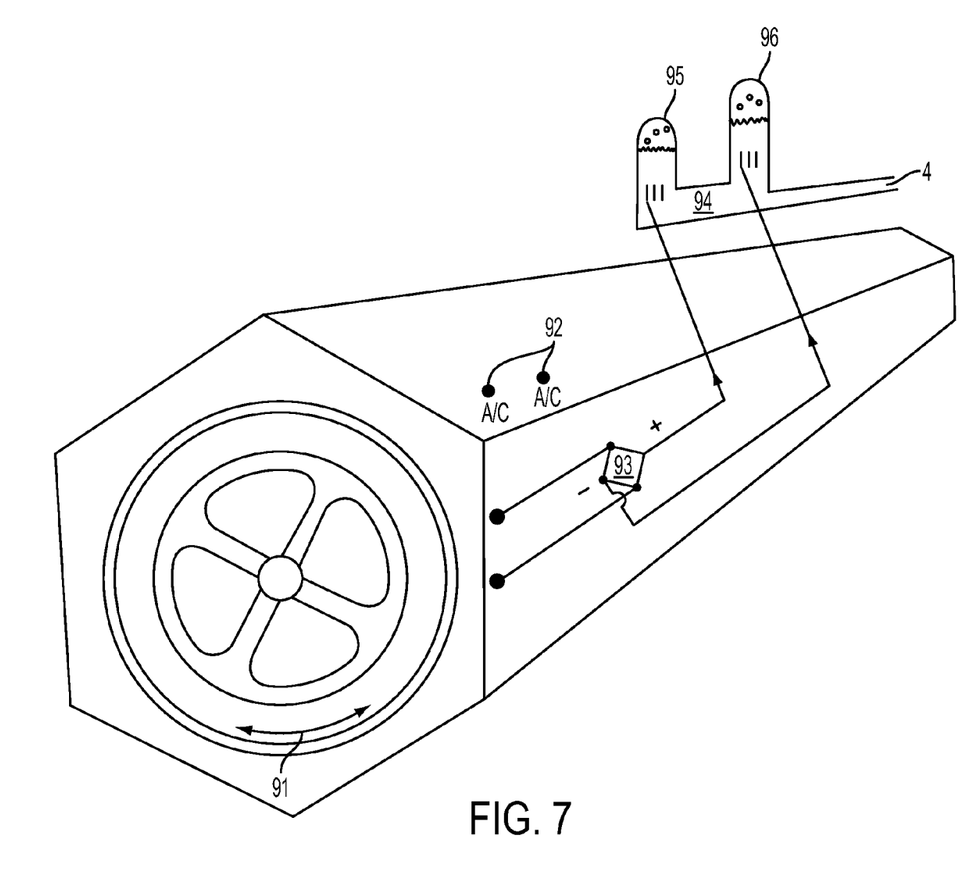
FIG. 7 shows a third exemplary embodiment in which the airflow within the system powers a generator.

FIG. 7 shows a fourth exemplary embodiment in which the airflow within the system powers a generator. That is, this exemplary embodiment provides a traditional generator 91 for outputting A/C energy 92. Moreover, at higher air flow levels, the A/C output can be rectified 93 to produce D/C current by a method that requires no moving parts. Accordingly, the water 94 that is produced by condensation, as discussed with respect to the first exemplary embodiment shown in FIG. 2, and the generated D/C current, can be used to produce hydrogen 95 and oxygen 96, for fuel cell use.

Figure 8:
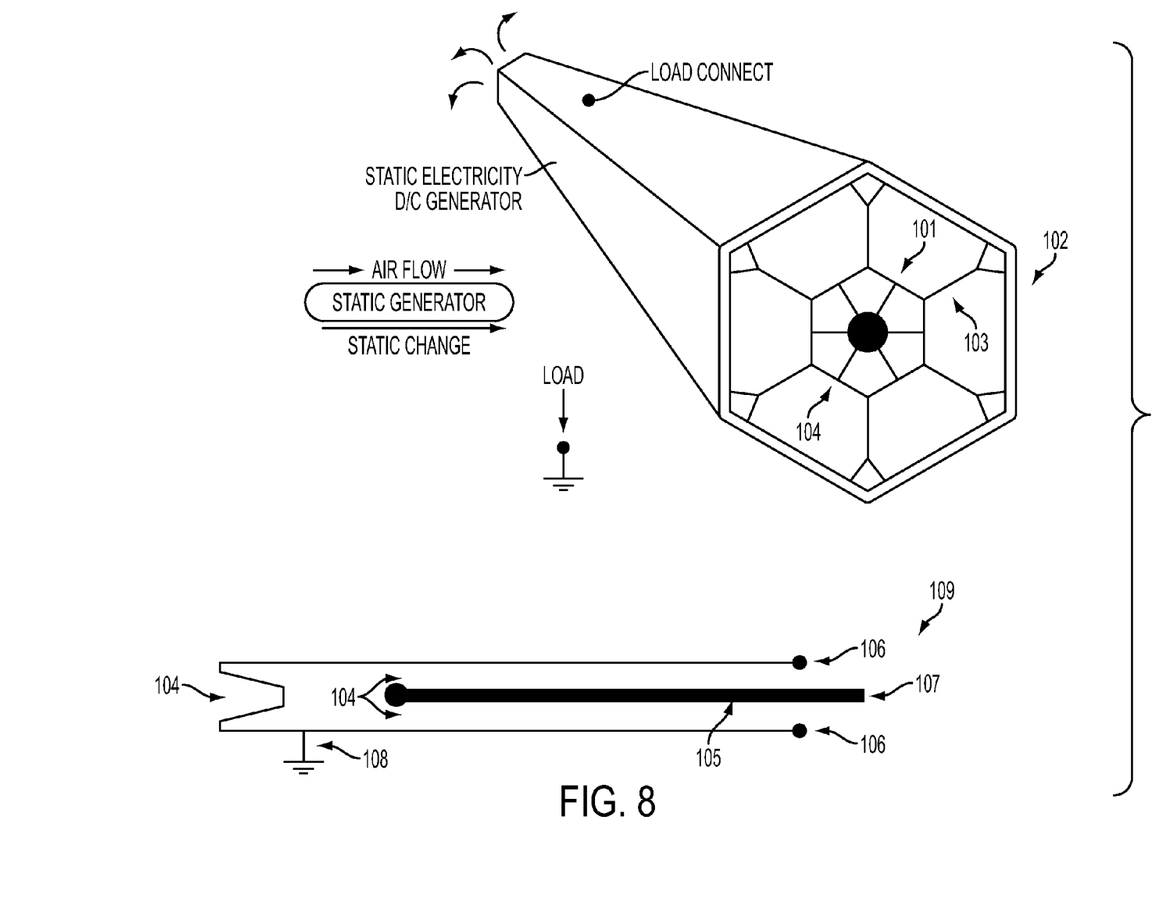
FIG. 8 shows a fourth exemplary embodiment in which the airflow within the system generates static electricity.

FIG. 8 shows fifth exemplary embodiment in which the airflow within the system generates static electricity. That is, the ambient energy chamber can include a static electric collection array or probe 101, an electrically conductive exterior 102, and thermally conductive, electrically insulated members 103 (e.g., ceramic) provided between the collection array or probe 101 and the electrically conductive exterior 102. The electrically conductive exterior 102 is connected to a system ground 108. As high pressure air 104 enters the ambient energy chamber, a static charge is produced at the collection array or probe 101. A difference in potential between a port 107 of the collection array or probe 101 and a port 106 of the electrically conductive exterior 102 produces a voltage at load 109.

The invention has been described and illustrated several exemplary embodiments. It will be appreciated, however, that the invention can be applied otherwise, and that the dimensions, materials and other variables may be altered to suit individual design considerations without departing from the spirit and scope of the present invention. For example, a cold chamber can be produced within the system by passing cold, winter air over a material. If the cooled chamber is insulated properly, cooled air passing through the cold chamber can then be used as cooling air in the summer.

What is claimed is:

1. A system for transmitting thermal energy, comprising:
an intake for introducing air at a first temperature;
an exhaust for exhausting the air, wherein the exhaust is provided at a higher vertical elevation than intake;
a waste thermal energy source provided at second temperature higher than the first temperature, the waste thermal energy source being provided at a position between the intake and the exhaust; and
a first ambient energy chamber configured to pass the air through the waste thermal energy source, the first ambient energy chamber includes a pipe having a thermally conductive outer shell such that energy from the waste thermal energy source passes via the outer shell to the air passing within the first ambient energy chamber;
a second ambient energy chamber provided between the first ambient energy chamber and the exhaust, the second ambient energy chamber includes a pipe having an outer shell made of material that is slower-loading than the thermally conductive outer shell, such that energy of the air passing within the second ambient energy chamber is transmitted to the slower-loading material; and
an energy delivery system including a separate air intake and a separate air exhaust, energy from the slower-loading material of the second ambient energy chamber being transmitted to delivery air passing within the energy delivery system;
the air introduced via the intake is exhausted via the exhaust due to a difference in elevation between the intake and the exhaust.

2. The system of claim 1, wherein the pipe having the outer shell made of material that is slower-loading is insulated, and the energy is transmitted to the energy delivery system at a non-insulated portion of the material that is slower-loading.

3. The system of claim 1, wherein the material that is slower-loading comprises concrete, stone, asphalt, or rock.

4. A system for transmitting thermal energy, comprising:
an intake for introducing air at a first temperature;
an exhaust for exhausting the air, wherein the exhaust is provided at a higher vertical elevation than intake;
a thermal energy source provided at second temperature higher than the first temperature, the thermal energy source being provided at a position between the intake and the exhaust;
a first ambient energy chamber configured to pass the air through the thermal energy source, the first ambient energy chamber includes a pipe having a thermally conductive outer shell such that energy from the thermal energy source passes via the outer shell to the air passing within the first ambient energy chamber;
a second ambient energy chamber provided between the first ambient energy chamber and the exhaust, the second ambient energy chamber includes a pipe having an outer shell made of material that is slower-loading than the thermally conductive outer shell, such that energy of the air passing within the second ambient energy chamber is transmitted to the slower-loading material; and
an energy delivery system including a separate air intake and a separate air exhaust, energy from the slower-loading material being transmitted to delivery air passing within the energy delivery system;
wherein the air introduced via the intake passes the thermal energy source via the first ambient energy chamber and is exhausted via the exhaust due to a difference in elevation between the intake and the exhaust.

5. The system of claim 4, wherein the air is introduced via the intake and passes the thermal energy source without assistance of any moving parts.

6. The system of claim 4, wherein the thermal energy source comprises industrial warm water.

7. The system of claim 4, wherein the thermal energy source comprises a parking lot or a road.

8. The system of claim 4, further comprising a turbine generator that is activated by artificial airflow generated in the system.

9. The system of claim 4, further comprising a condensation chamber for producing purified water.

10. The system of claim 4, wherein hydrogen or oxygen are produced.

11. The system of claim 4, wherein the ambient energy chamber includes thermally conductive fins extending longitudinally within the outer shell.

12. The system of claim 4, wherein the pipe having the outer shell made of material that is slower-loading is insulated, and the energy is transmitted to the energy delivery system at a non-insulated portion of the material that is slower-loading.

13. The system of claim 4, wherein the material that is slower-loading comprises concrete, stone, asphalt, or rock.

14. The system of claim 13, wherein the thermally conductive outer shell comprises metal.

15. A method for transmitting thermal energy, comprising:
introducing air at a first temperature via an intake;
passing the air introduced at the intake through a first ambient energy chamber, the first ambient energy chamber including a pipe having a thermally conductive outer shell such that energy from a thermal energy source passes via the outer shell to the air passing within the ambient energy chamber, the thermal energy source provided at second temperature higher than the first temperature;
passing the air from the first ambient energy chamber to a second ambient energy chamber, the second ambient energy chamber including a pipe having an outer shell made of material that is slower-loading than the thermally conductive outer shell, such that energy of the air passing within the second ambient energy chamber is transmitted to the slower-loading material; and transmitting energy from the slower-loading material of the second ambient energy chamber to delivery air passing within an energy delivery system including a separate air intake and a separate air exhaust; and exhausting the air at an exhaust, wherein the exhaust is provided at a higher vertical elevation than the intake and the air is exhausted via the exhaust due to a difference in elevation between the intake and the exhaust.

16. The method of claim 15, wherein the air is introduced via the intake and passes the thermal energy source without assistance of any moving parts.

17. The method of claim 16, wherein the material that is slower-loading comprises concrete, stone, asphalt, or rock.

18. The method of claim 15, wherein the thermal energy source comprises industrial warm water.

19. The method of claim 15, wherein the thermal energy source comprises a parking lot or a road.

20. The method of claim 15, wherein the pipe having the outer shell made of material that is slower-loading is insulated, and the energy is transmitted to the energy delivery system at a non-insulated portion of the material that is slower-loading.

* * * * *